(12) United States Patent
Watanabe et al.

(10) Patent No.: US 10,601,008 B2
(45) Date of Patent: Mar. 24, 2020

(54) BATTERY PACK

(71) Applicant: TOYOTA JIDOSHA KABUSHIKI KAISHA, Toyota-shi, Aichi-ken (JP)

(72) Inventors: Hirotaka Watanabe, Toyota (JP); Shigeyuki Inoue, Toyota (JP); Satoshi Inukai, Nagoya (JP); Teruchika Mizuno, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/351,653

(22) Filed: Mar. 13, 2019

(65) Prior Publication Data
US 2019/0296298 A1    Sep. 26, 2019

(30) Foreign Application Priority Data

Mar. 22, 2018   (JP) .................................. 2018-054793

(51) Int. Cl.
*H01M 2/10* (2006.01)
*B60L 50/64* (2019.01)
*B60L 50/60* (2019.01)

(52) U.S. Cl.
CPC .......... *H01M 2/1083* (2013.01); *B60L 50/64* (2019.02); *B60L 50/66* (2019.02); *H01M 2/1077* (2013.01); *H01M 2220/20* (2013.01)

(58) Field of Classification Search
CPC .......... B60R 16/04; B60K 1/04; B60L 50/56; H01M 2/1083
See application file for complete search history.

(56) References Cited

U.S. PATENT DOCUMENTS

2011/0297469 A1* 12/2011 Usami .................. B60K 1/04
                                                       180/68.5
2016/0090003 A1   3/2016 Hirota

FOREIGN PATENT DOCUMENTS

JP    2011-218910 A    11/2011
JP    2016-068850 A    5/2016

* cited by examiner

*Primary Examiner* — John D Walters
*Assistant Examiner* — James J Triggs
(74) *Attorney, Agent, or Firm* — Sughrue Mion, PLLC

(57) ABSTRACT

A battery pack includes: a plurality of cell stacks; a housing case configured to house the plurality of cell stacks; and a support member configured to allow a rear cross member provided in a vehicle to support the housing case, the housing case including a rear portion directed to a rear side of the vehicle in a mounted state in which the battery pack is mounted on the vehicle, the support member extending in an up-down direction and being fixed to the housing case from an outer side of the housing case so as to face the rear portion.

4 Claims, 5 Drawing Sheets

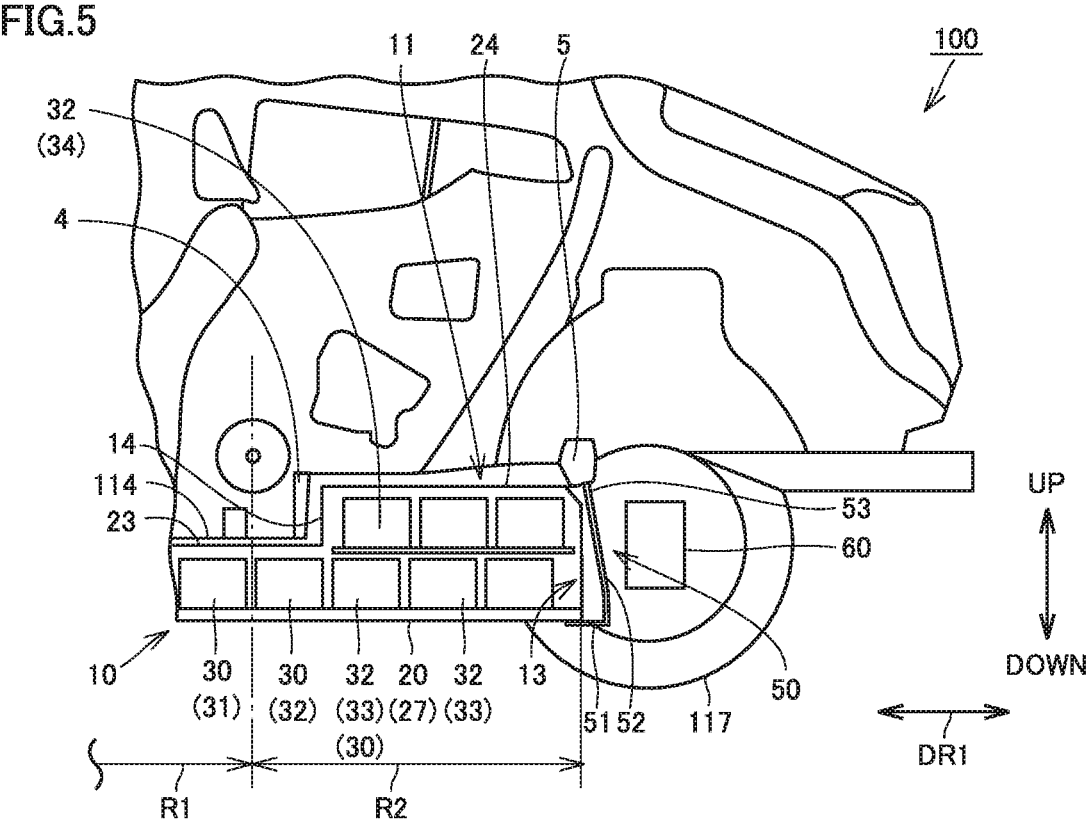
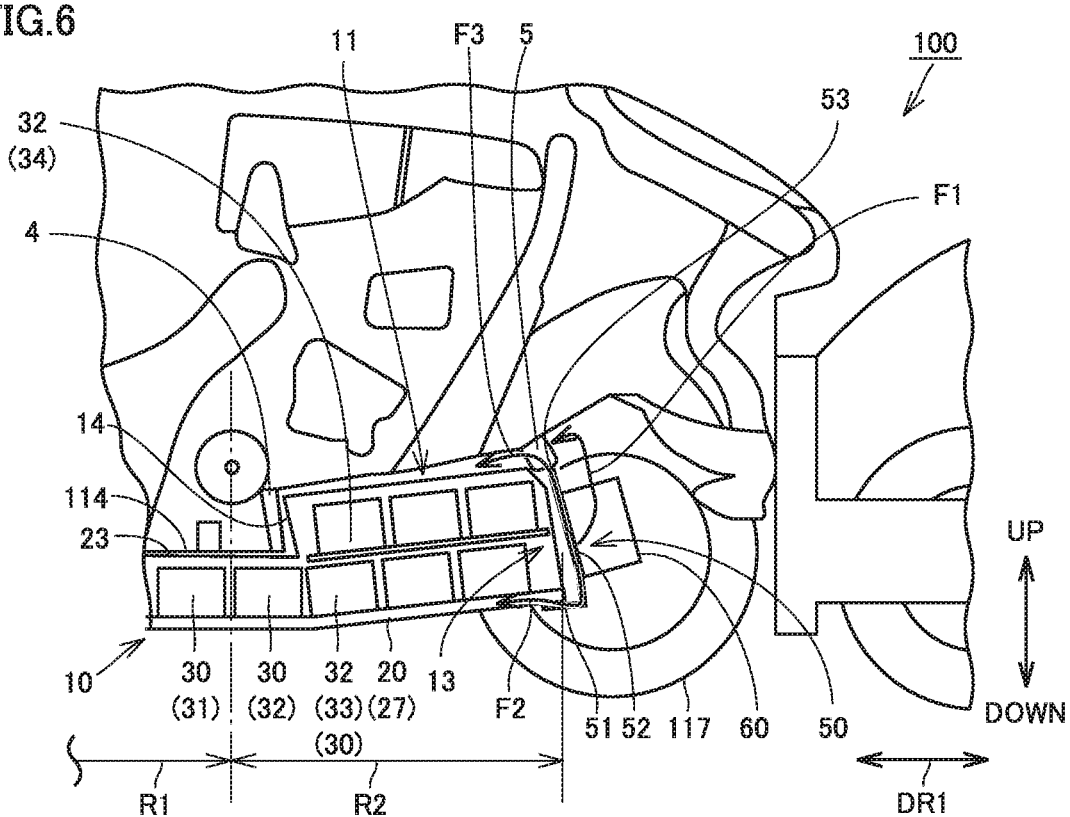

BATTERY PACK

This nonprovisional application is based on Japanese Patent Application No. 2018-054793 filed on Mar. 22, 2018 with the Japan Patent Office, the entire contents of which are hereby incorporated by reference.

BACKGROUND

Field

The present disclosure relates to a battery pack, and particularly to a battery pack mounted on a vehicle.

Description of the Background Art

A battery pack configured to supply electric power to a motor is mounted on a vehicle such as an electric vehicle and a hybrid vehicle. The battery pack is assembled at a position located forward of a rear suspension, and below a floor panel of the vehicle.

For example, Japanese Patent Laying-Open No. 2011-218910 discloses a vehicle having a battery pack mounted thereon.

In the vehicle disclosed in Japanese Patent Laying-Open No. 2011-218910, a bracket fixed to a side member is provided with a case mount portion configured to support a battery pack case (housing case), and a suspension mount portion configured to support a rear suspension arm.

An attachment portion provided on a bottom portion of the housing case is fixed to the case mount portion arranged in a lateral part of the housing case, and a front end side of the rear suspension arm is fixed to the suspension mount portion arranged on the more rear side than the case mount portion.

Both the housing case and the rear suspension arm are supported by the bracket fixed to the side member, and thus, shock provided to the rear suspension arm when the vehicle receives rear collision can be distributed into shock transmitted to the side member and shock transmitted through the case mount portion to the bottom portion of the housing case.

SUMMARY

However, when a vehicle receives rear collision, a rear suspension as a whole arranged at the rear of a battery pack may move forward. In such a case, the bracket disclosed in Japanese Patent Laying-Open No. 2011-218910 has difficulty in sufficiently suppressing collision between the rear suspension and the housing case. When the rear suspension collides with the housing case, it is concerned that shock is transmitted to a plurality of cell stacks housed in the housing case. In this case, the cell stacks may be broken in some cases.

The present disclosure has been made in light of the above-described problem, and an object of the present disclosure is to provide a battery pack that makes it possible to suppress a break of a plurality of cell stacks housed in a housing case.

A battery pack based on the present disclosure is a battery pack mounted on a vehicle, and includes: a plurality of cell stacks; a housing case configured to house the plurality of cell stacks; and a support member configured to allow a rear cross member provided in the vehicle to support the housing case. The housing case includes a rear portion directed to a rear side of the vehicle in a mounted state in which the battery pack is mounted on the vehicle. The support member extends in an up-down direction and is fixed to the housing case from an outer side of the housing case so as to face the rear portion.

According to the above-described configuration, when the battery pack is mounted on the vehicle, the support member faces the rear portion of the housing case from the rear side of the vehicle. Therefore, when the vehicle having the above-described battery pack mounted thereon receives rear collision and a component such as a rear suspension arranged at the rear of the battery pack moves forward, the component collides with the support member, not the housing case.

A part of shock provided to the support member returns to the rear suspension side, and the remaining shock provided to the support member is transmitted to the bottom portion of the housing case and the rear cross member to which the support member is connected. The shock returning to the rear suspension side and the shock transmitted to the rear cross member are transmitted to a framework of the vehicle.

The shock is distributed by the support member as described above, and thus, direct provision of the shock to the plurality of cell stacks housed in the housing case can be suppressed. As a result, a break of the plurality of cell stacks housed in the housing case can be suppressed.

In the battery pack based on the present disclosure, the plurality of cell stacks may be spaced apart from one another and arranged side by side in a first direction parallel to a front-rear direction of the vehicle in the mounted state. The plurality of cell stacks may include a plurality of first cell stacks arranged on one side in the first direction that is a front side of the vehicle in the mounted state, and a plurality of second cell stacks arranged on the other side in the first direction that is the rear side of the vehicle in the mounted state. In this case, the housing case preferably includes an upper wall portion and a bottom portion connected to the rear portion and arranged to face each other in the up-down direction, and a first housing region where the plurality of first cell stacks are housed and a second housing region where the plurality of second cell stacks are housed are preferably formed between the upper wall portion and the bottom portion. In addition, the upper wall portion is preferably provided such that an up-down-direction height on the other side in the first direction is higher than an up-down-direction height on the one side in the first direction. Furthermore, in this case, an up-down-direction distance between the second cell stacks arranged on the second housing region side and the upper wall portion is preferably longer than an up-down-direction distance between the first cell stacks arranged on the first housing region side and on the one side in the first direction and the upper wall portion.

When the vehicle having the above-described battery pack mounted thereon receives rear collision, shock is provided to a rear side member and the rear cross member such that the rear side member and the rear cross member move toward the front side of the vehicle. As a result, the support member in a portion attached to the rear cross member also moves toward the front side of the vehicle. Therefore, the housing case is deformed such that a portion on the front side (one side in the first direction) of the vehicle and a portion on the rear side (the other side in the first direction) of the vehicle rise and a portion between the portion on the front side and the portion on the rear side is valley-folded. In this case, in the valley-folded portion of the housing case, the cell stacks adjacent to each other move to come closer to each other.

In the battery pack configured as described above, the up-down-direction distance between the second cell stacks arranged on the second housing region side located on the rear side of the vehicle and the upper wall portion is longer than the up-down-direction distance between the first cell stacks arranged on the first housing region side located on the front side of the vehicle and on one side in the first direction and the upper wall portion. Therefore, in the valley-folded portion of the housing case, a space that allows movement of the cell stacks can be sufficiently ensured, and mutual interference of the cell stacks moving to come closer to each other can be suppressed. As a result, collision between the cell stacks can be suppressed.

In the battery pack based on the present disclosure, the plurality of second cell stacks may include a plurality of lower-side cell stacks, and at least one or more upper-side cell stacks arranged above the plurality of lower-side cell stacks. In this case, the plurality of lower-side cell stacks are preferably arranged side by side along the first direction on the other side in the first direction of the plurality of first cell stacks, and the housing case preferably includes a lower portion configured to house the plurality of first cell stacks and the plurality of lower-side cell stacks, and an upper portion configured to house the at least one or more upper-side cell stacks. In addition, the upper portion preferably includes a rear wall portion forming a part of the rear portion, and a front wall portion facing the rear wall portion from the one side in the first direction. Furthermore, in this case, a length along the first direction from one-side ends of the at least one or more upper-side cell stacks located on the one side in the first direction to the front wall portion is preferably longer than a length along the first direction from other-side ends of the at least one or more upper-side cell stacks located on the other side in the first direction to the rear wall portion.

When the vehicle having the battery pack mounted thereon as described above receives rear collision, the housing case is deformed such that the portion between the portion on the front side and the portion on the rear side is valley-folded. In the case where the housing case is deformed in a valley-folded manner when rear collision is received by the vehicle on which the two-stage battery pack is mounted such that the upper portion of the housing case is arranged in a gap between the cross members arranged side by side along the front-rear direction of the vehicle, the front wall portion of the upper portion moves to come closer to the cross member located on the more vehicle front side than the upper portion.

In the battery pack configured as described above, the length along the first direction from the one-side ends of the at least one or more upper-side cell stacks located on the one side in the first direction to the front wall portion is longer than the length along the first direction from the other-side ends of the at least one or more upper-side cell stacks located on the other side in the first direction to the rear wall portion.

Therefore, a space between the one-side ends of the at least one or more upper-side cell stacks located on the one side in the first direction and the front wall portion can be sufficiently ensured. As a result, even when the front wall portion collides with the cross member located on the front side of the front wall portion and is deformed, interference of the upper-side cell stacks with the front wall portion can be suppressed.

In the battery pack based on the present disclosure, a gap between the front wall portion and the at least one or more upper-side cell stacks is preferably located directly above a gap between any one pair of lower-side cell stacks adjacent to each other, of the plurality of lower-side cell stacks.

In such a configuration, when the housing case is deformed in a valley-folded manner in a portion located between the lower-side cell stacks arranged below the upper-side cell stacks facing the front wall portion and the lower-side cell stacks located on the front side (one side in the first direction) of the above-described lower-side cell stacks, a space that allows movement of the lower-side cell stacks adjacent to each other can be more sufficiently ensured in the valley-folded portion of the housing case. As a result, mutual interference of the lower-side cell stacks moving to come closer to each other can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a schematic view showing a state before the vehicle having the battery pack according to the embodiment mounted thereon receives rear collision.

FIG. 6 is a schematic view showing a state after the vehicle having the battery pack according to the embodiment mounted thereon receives rear collision.

DESCRIPTION OF THE PREFERRED EMBODIMENTS

Figure 1:
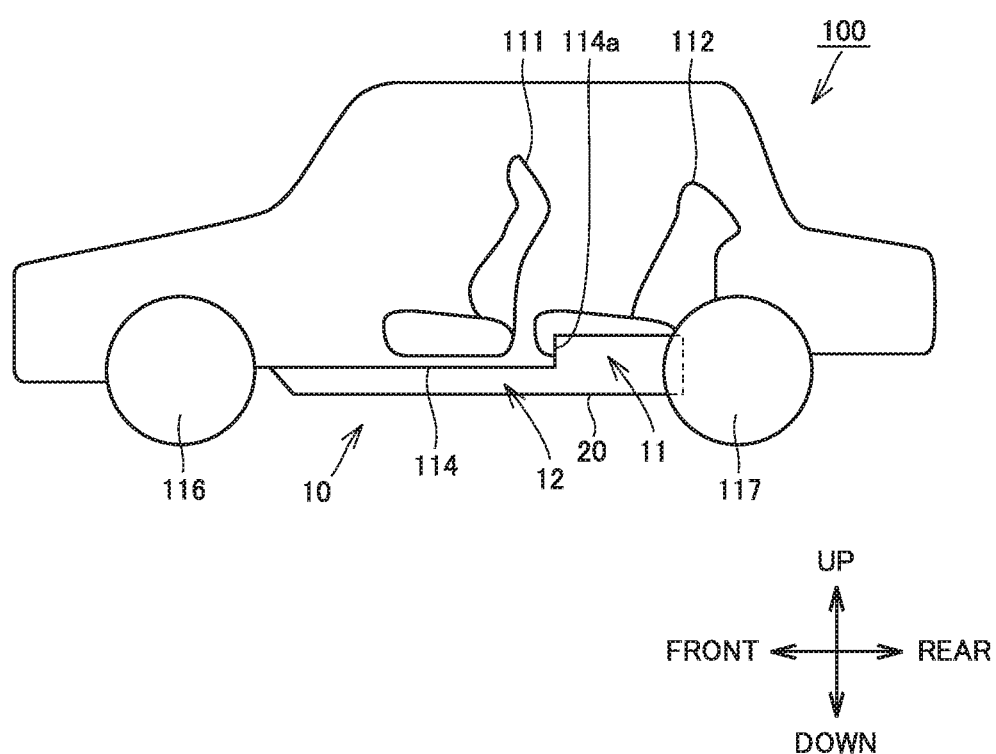
FIG. 1 shows a vehicle on which a battery pack according to an embodiment is mounted.

An embodiment of the present disclosure will be described in detail hereinafter with reference to the drawings. In the embodiment described below, the same or common portions are denoted by the same reference characters in the drawings, and description thereof will not be repeated. When the number, an amount or the like is mentioned in the embodiment described below, the scope of the present disclosure is not necessarily limited to that number, that amount or the like unless otherwise specified.

FIG. 1 shows a vehicle on which a battery pack according to an embodiment is mounted. A vehicle 100 having a battery pack 10 according to the embodiment mounted thereon will be described with reference to FIG. 1.

As shown in FIG. 1, vehicle 100 is, for example, an electric vehicle and includes an electric motor as a prime mover for driving the vehicle. Vehicle 100 has a front seat 111, a rear seat 112, a floor panel 114, a front wheel 116, a rear wheel 117, and battery pack 10. Battery pack 10 is configured by electrically serially connecting a plurality of cell stacks 30 described below, and thus, battery pack 10 can supply electric power to the electric motor at high output.

Floor panel 114 is a panel member forming a floor surface of vehicle 100. Floor panel 114 has an upwardly-bulging portion 114a on the lower side of rear seat 112. Battery pack 10 includes a housing case 20 having an upper portion 11 and a lower portion 12, and upper portion 11 is arranged below bulging portion 114a. Battery pack 10 as a whole is arranged below floor panel 114.

Figure 2:
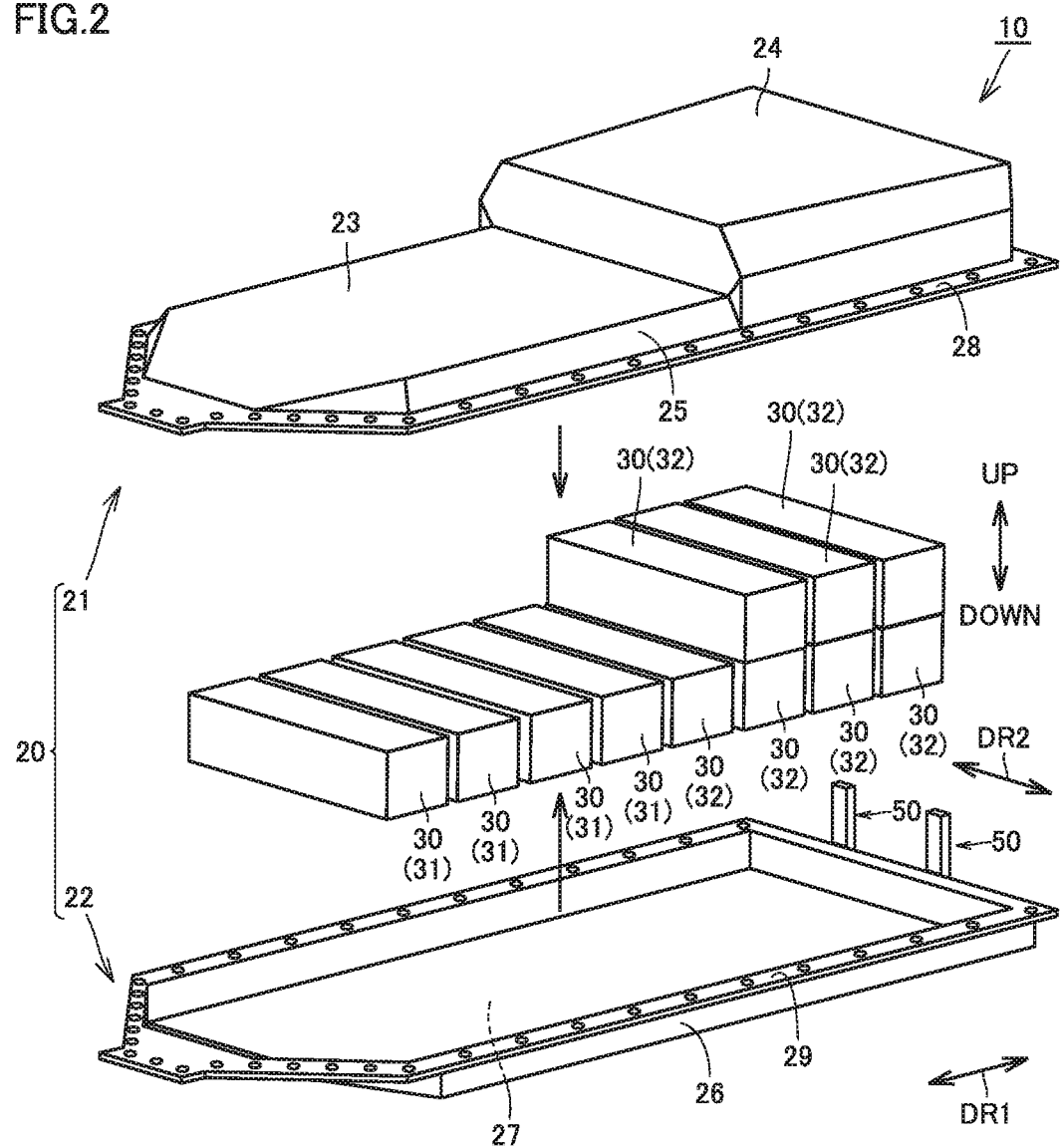
FIG. 2 is an exploded perspective view of the battery pack according to the embodiment.

FIG. 2 is an exploded perspective view of the battery pack according to the embodiment. A configuration of battery pack 10 according to the embodiment will be described with reference to FIG. 2.

Battery pack 10 has housing case 20, a plurality of cell stacks 30, and a plurality of support members 50. Housing case 20 is formed of a case body that forms an internal space, and has an appearance extending in a horizontal direction, with an up-down direction corresponding to a thickness direction. Housing case 20 extends along a first direction (DR1 direction) and has a longitudinal shape. The first direction is orthogonal to the up-down direction and is parallel to a vehicle front-rear direction in a mounted state in which battery pack 10 is mounted on vehicle 100.

The plurality of cell stacks 30 are housed in housing case 20. Housing case 20 has a bottom portion 27. Bottom portion 27 forms a bottom wall of housing case 20. The plurality of cell stacks 30 are housed on bottom portion 27.

Housing case 20 has an upper case 21 and a lower case 22. Upper case 21 has a box shape that is open downwardly. Upper case 21 has a ceiling portion 23, a sidewall portion 25 and a flange portion 28. Ceiling portion 23 forms an upper wall of housing case 20. Ceiling portion 23 has a raised portion 24. Raised portion 24 has a shape of being raised upwardly in ceiling portion 23. Raised portion 24 is provided on the vehicle rear side. A plurality of second cell stacks 32 described below are housed in raised portion 24. Sidewall portion 25 is provided to extend downwardly from an outer peripheral edge of ceiling portion 23. Flange portion 28 extends from a lower end of sidewall portion 25 to the outside of housing case 20, thereby forming a flange shape.

Lower case 22 has a box shape that is open upwardly. Lower case 22 has bottom portion 27 described above, a sidewall portion 26 and a flange portion 29. Bottom portion 27 is provided to face ceiling portion 23 in the up-down direction. Sidewall portion 26 is provided to extend upwardly from an outer peripheral edge of bottom portion 27. Sidewall portion 26 forms a sidewall of housing case 20, together with sidewall portion 25 of upper case 21. Flange portion 29 extends from an upper end of sidewall portion 26 to the outside of housing case 20, thereby forming a flange shape.

With flange portion 28 and flange portion 29 being stacked in the up-down direction, flange portion 28 and flange portion 29 are fastened by a plurality of fastening members (not shown). As a result, upper case 21 and lower case 22 are integrally coupled to each other and form a space for housing the plurality of cell stacks 30.

The plurality of cell stacks 30 include a plurality of first cell stacks 31 and a plurality of second cell stacks 32. As described below, the plurality of first cell stacks 31 are located on one side in the first direction with respect to a central portion CL (see FIG. 4) in the first direction in an arrangement region R (see FIG. 4) where the plurality of cell stacks 30 are arranged, and the plurality of second cell stacks 32 are arranged on the other side in the first direction with respect to above-described central portion CL.

The plurality of cell stacks 30 include a plurality of cell stacks 30 arranged in lower portion 12, and a plurality of cell stacks 30 (upper-side cell stacks 34 described below (see FIG. 4)) arranged in upper portion 11.

The plurality of cell stacks 30 arranged in lower portion 12 are spaced apart from one another and arranged side by side in the first direction. As one example, eight cell stacks 30 are arranged side by side in lower portion 12. Each of cell stacks 30 arranged in lower portion 12 has a plurality of cells (not shown) arranged side by side in a second direction (DR2 direction) orthogonal to the first direction. As one example, each of cell stacks 30 arranged in lower portion 12 has approximately 24 to 30 cells. The second direction is parallel to a vehicle width direction in the mounted state in which battery pack 10 is mounted on vehicle 100.

The plurality of cell stacks 30 arranged in upper portion 11 are spaced apart from one another and arranged side by side in the first direction. On the other side in the first direction, the plurality of cell stacks 30 arranged in upper portion 11 are located above the plurality of cell stacks 30 arranged in lower portion 12. The number of the plurality of cell stacks 30 arranged in upper portion 11 is smaller than the number of the plurality of cell stacks 30 arranged in lower portion 12. As one example, three cell stacks 30 are arranged side by side in upper portion 11.

Each of cell stacks 30 arranged in upper portion 11 also has a plurality of cells arranged side by side in the second direction. Each of cell stacks 30 arranged in upper portion 11 may have the smaller number of cells than that of each cell stack 30 arranged in lower portion 12. As one example, each of cell stacks 30 arranged in upper portion 11 has approximately 21 to 27 cells. The number of cells included in each cell stack 30 arranged in upper portion 11 may be identical to the number of cells included in each cell stack 30 arranged in lower portion 12.

Each of the cells included in cell stacks 30 is, for example, a secondary battery such as a nickel-metal hydride battery or a lithium ion battery. Each of the cells has, for example, a rectangular shape. The secondary battery may be a battery including a liquid electrolyte, or a battery including a solid electrolyte.

A detailed positional relationship of the plurality of cell stacks 30 arranged in housing case 20 will be described below with reference to FIG. 4.

The plurality of support members 50 are formed of frame members extending in the up-down direction. Support members 50 are for allowing a cross member 5 (see FIG. 3) to support housing case 20. The plurality of support members 50 are spaced apart from one another and arranged side by side in the second direction. As one example, two support members 50 are arranged side by side.

Figure 3:
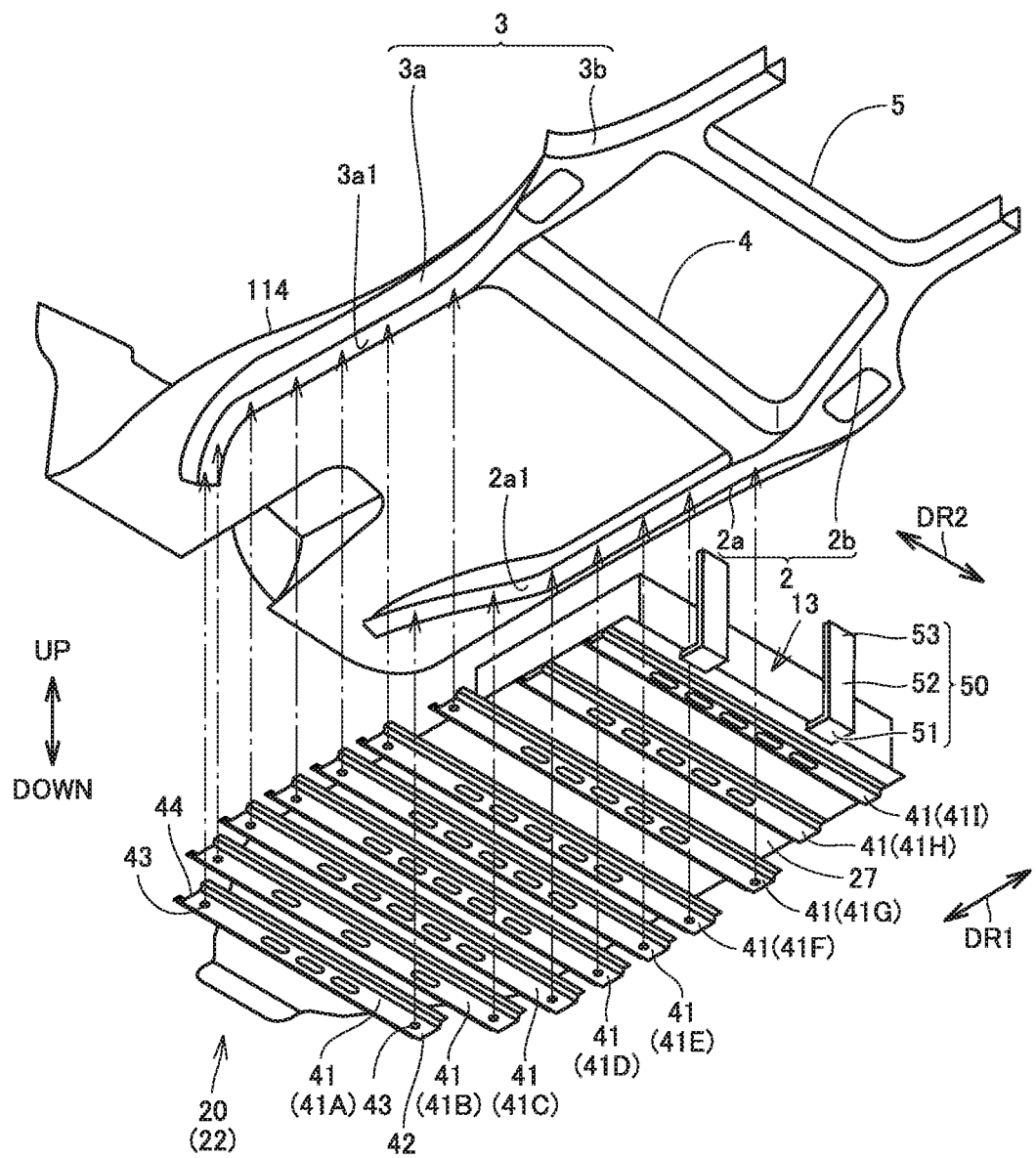
FIG. 3 is a perspective view showing a manner in which the battery pack according to the embodiment is mounted on the vehicle.

FIG. 3 is a perspective view showing a manner in which the battery pack according to the embodiment is mounted below the floor panel. Vehicle 100 includes, as a framework, a pair of side members 2 and 3, and a plurality of cross members 4 and 5.

The pair of side members 2 and 3 extend along the vehicle front-rear direction. The pair of side members 2 and 3 are spaced apart from each other in the vehicle width direction. The pair of side members 2 and 3 have a pair of floor side members 2a and 3a located on the front side, and a pair of rear side members 2b and 3b located on the rear side.

The front end sides of the pair of rear side members 2b and 3b are connected to the rear end sides of the pair of floor side members 2a and 3a. The front end sides of the pair of rear side members 2b and 3b are curved upwardly toward the rear side.

The front end sides of the pair of rear side members 2b and 3b are connected by cross member 4. Cross member 4 extends along the vehicle width direction. On the rear side of cross member 4, the pair of rear side members 2b and 3b are connected to cross member 5 serving as a rear cross member. Cross member 5 extends along the vehicle width direction.

Cross member 4 and cross member 5 are spaced apart from each other in the vehicle front-rear direction such that upper portion 11 of battery pack 10 can be housed therebetween.

Battery pack 10 further includes a plurality of attachment members 41 (41A, 41B, 41C, 41D, 41E, 41F, 41G, 41H, and 41I), and a plurality of support members 50.

Attachment members 41 are provided on bottom portion 27. Attachment members 41 are arranged on an outer side of housing case 20. Attachment members 41 are fixed to bottom portion 27 from the outer side of housing case 20. Attachment members 41 are provided to face, in the up-down direction, a road surface on which vehicle 100 travels. Attachment members 41 may be fixed to bottom portion 27 by welding, or may be fixed to bottom portion 27 by fastening members such as bolts.

The plurality of attachment members 41 are provided to be parallel to one another. The plurality of attachment members 41 are spaced apart from one another. The plurality of attachment members 41 are provided along the vehicle width direction. The plurality of attachment members 41 are spaced apart from one another in the vehicle front-rear direction. Attachment member 41A, attachment member 41B, attachment member 41C, attachment member 41D, attachment member 41E, attachment member 41F, attachment member 41G, attachment member 41H, and attachment member 41I are provided side by side from the vehicle front side to the vehicle rear side in the listed order.

Each of attachment members 41 is formed of a frame member extending in the vehicle width direction. Each of attachment members 41 (more specifically, attachment member 41A, attachment member 41B, attachment member 41C, attachment member 41D, attachment member 41E, attachment member 41F, and attachment member 41G) has a fastened portion 42 and a fastened portion 44. Fastened portion 42 and fastened portion 44 are provided at both ends of attachment member 41 extending in the vehicle width direction. Fastened portion 42 is provided to protrude from housing case 20 (bottom portion 27) on one side (right side) in the vehicle width direction. Fastened portion 44 is provided to protrude from housing case 20 on the other side (left side) in the vehicle width direction.

Each of fastened portion 42 and fastened portion 44 is provided with a bolt insertion hole 43. Fastened portion 42 and fastened portion 44 are fixed to bottom surfaces 2a1 and 3a1 of the pair of floor side members 2a and 3a, respectively, by bolts inserted into bolt insertion holes 43.

Attachment member 41H and attachment member 41I are provided not to protrude from housing case 20 in the vehicle width direction.

Each of support members 50 has a connection portion 51 and a rising portion 52. Connection portion 51 is connected to bottom portion 27. Specifically, connection portion 51 is fixed to bottom portion 27 by a fastening member and the like. Rising portion 52 rises upwardly from connection portion 51. Rising portion 52 is arranged at a distance from housing case 20. An attachment portion 53 configured to attach rising portion 52 to cross member 5 is provided on the upper end side of rising portion 52. Attachment portion 53 is fixed to cross member 4 by a fastening member and the like.

Figure 4:
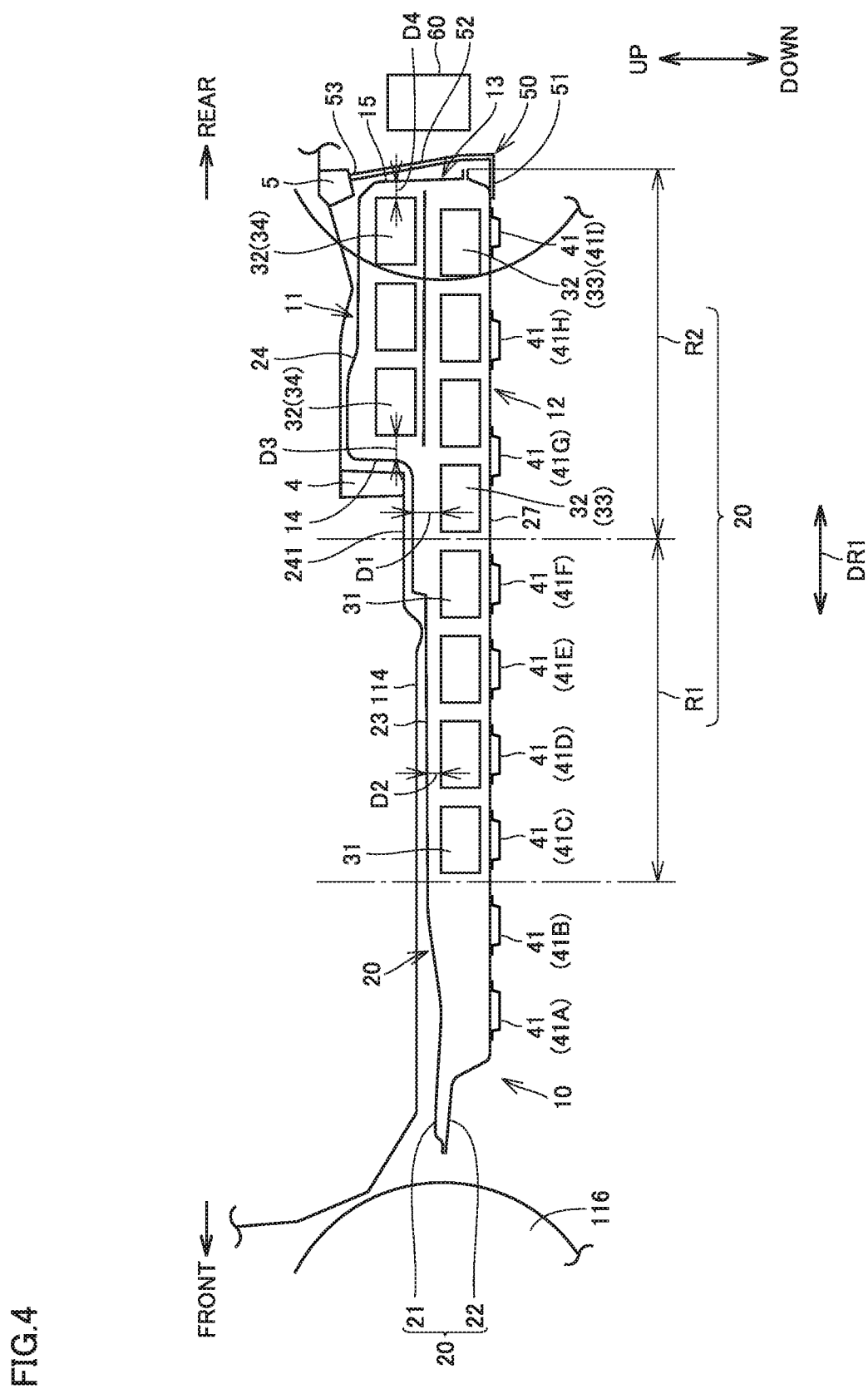
FIG. 4 is a cross-sectional view of the vehicle in a mounted state in which the battery pack according to the embodiment is mounted on the vehicle.

FIG. 4 is a cross-sectional view of the vehicle in the mounted state in which the battery pack according to the embodiment is mounted on the vehicle. Battery pack 10 in the mounted state will be described with reference to FIG. 4.

As shown in FIG. 4, housing case 20 of battery pack 10 includes a rear portion 13 directed to the vehicle rear side in the above-described mounted state. Bottom portion 27 of housing case 20 is connected to a lower end of rear portion 13. Rising portion 52 is provided to face rear portion 13 from the vehicle rear side in the above-described mounted state. A rear suspension 60 is arranged at the rear of rising portion 52.

A first housing region R1 and a second housing region R2 are formed between ceiling portion 23 (upper wall portion) and bottom portion 27 of housing case 20. First housing region R1 is located on one side (vehicle front side in the above-described mounted state) in the first direction with respect to the center, in the first direction, of the plurality of cell stacks 30 arranged in lower portion 12. Second housing region R2 is located on the other side (vehicle rear side in the above-described mounted state) in the first direction with respect to the above-described center.

The above-described plurality of first cell stacks 31 are housed in first housing region R1, and the above-described plurality of second cell stacks 32 are housed in second housing region R2.

Ceiling portion 23 is provided such that an up-down-direction height on the other side in the first direction is higher than an up-down-direction height on one side in the first direction. As a result, an up-down-direction distance D1 between second cell stacks 32 arranged on the second housing region R2 side and ceiling portion 23 is longer than an up-down-direction distance D2 between first cell stacks 31 arranged on the first housing region R1 side and on one side in the first direction and ceiling portion 23.

Specifically, ceiling portion 23 is configured to become higher in a stepwise manner toward the other side in the first direction, and an intermediate raised portion 241 is provided between ceiling portion 23 in a portion located on one side in the first direction and raised portion 24. An up-down-direction height of raised portion 24 is higher than an up-down-direction height of intermediate raised portion 241. Intermediate raised portion 241 is provided in the substantially central portion of the plurality of cell stacks 30 arranged in lower portion 12 (plurality of cell stacks 30 arranged in a row). As a result, up-down-direction distance D1 between second cell stacks 32 arranged in intermediate raised portion 241 and ceiling portion 23 is longer than up-down-direction distance D2 between first cell stacks 31 arranged on the first housing region R1 side and on one side in the first direction and ceiling portion 23.

The plurality of second cell stacks 32 have a structure stacked vertically in two stages, and include a plurality of lower-side cell stacks 33 and a plurality of upper-side cell stacks 34. The plurality of lower-side cell stacks 33 are arranged side by side along the first direction, on the other side in the first direction of the plurality of first cell stacks 31. The plurality of first cell stacks 31 and the plurality of lower-side cell stacks 33 are housed in lower portion 12 of housing case 20.

The plurality of upper-side cell stacks 34 are arranged above the plurality of lower-side cell stacks 33. The plurality of upper-side cell stacks 34 are housed in upper portion 11 of housing case 20.

Upper portion 11 has a front wall portion 14 and a rear wall portion 15 that face each other in the first direction. Rear wall portion 15 forms a part of above-described rear portion 13. Front wall portion 14 faces rear wall portion 15 from one side in the first direction.

A length D3 along the first direction from one-side ends of the plurality of upper-side cell stacks 34 located on one side in the first direction to front wall portion 14 is longer than a length D4 along the first direction from other-side ends of the plurality of upper-side cell stacks 34 located on the other side in the first direction to rear wall portion 15.

A gap between the plurality of upper-side cell stacks 34 and front wall portion 14 (particularly, a gap between upper-side cell stack 34 arranged on one end in the first direction, of the plurality of upper-side cell stacks 34, and front wall portion 14) is located directly above a gap between lower-side cell stack 33 arranged below upper-side cell stack 34 arranged on the other end in the first direction, of the plurality of upper-side cell stacks 34, and lower-side cell stack 33 adjacent to this lower-side cell stack 33 from one side in the first direction.

FIG. 5 is a schematic view showing a state before the vehicle having the battery pack according to the embodiment mounted thereon receives rear collision. FIG. 6 is a schematic view showing a state after the vehicle having the battery pack according to the embodiment mounted thereon receives rear collision. The case in which the vehicle having the battery pack according to the embodiment mounted thereon receives rear collision will be described with reference to FIGS. 5 and 6.

As shown in FIG. 5, support members 50 connected to cross member 5 are fixed to housing case 20 from the outer side of housing case 20 so as to face rear portion 13 of the housing case from the rear side of vehicle 100.

Therefore, as shown in FIG. 6, when vehicle 100 receives rear collision and the component such as rear suspension 60 arranged at the rear of battery pack 10 moves forward, the component collides with support members 50 (more particularly, rising portions 52), not housing case 20.

A part of shock provided to support members 50 returns to the rear suspension side as indicated by an arrow F1, and the remaining shock provided to support members 50 is transmitted to bottom portion 27 of housing case 20 and the rear cross member to which support members 50 are connected, as indicated by an arrow F2 and an arrow F3. The shock returning to the rear suspension 60 side and the shock transmitted to cross member 5 are transmitted to the framework of vehicle 100. The shock transmitted to bottom portion 27 is also transmitted through the plurality of attachment members 41 to the framework of vehicle 100.

The shock is distributed by support members 50 as described above, and thus, direct provision of the shock to the plurality of cell stacks 30 housed in housing case 20 can be suppressed. As a result, a break of the plurality of cell stacks 30 housed in housing case 20 can be suppressed.

In addition, as shown in FIG. 6, when vehicle 100 receives rear collision, shock is provided to rear side members 2*b* and 3*b* and cross member 5 such that rear side members 2*b* and 3*b* and cross member 5 move toward the front side of vehicle 100. As a result, attachment portions 53 of support members 50 that support housing case 20 also move toward the front side of vehicle 100. Therefore, housing case 20 is deformed such that a portion on the front side (one side in the first direction) of the vehicle and a portion on the rear side (the other side in the first direction) of the vehicle rise and a portion between the portion on the front side and the portion on the rear side is valley-folded. In this case, in the valley-folded portion of housing case 20, cell stacks 30 adjacent to each other move to come closer to each other.

In battery pack 10 according to the embodiment, as described above, up-down-direction distance D1 between second cell stacks 32 arranged on the second housing region R2 side located on the rear side of vehicle 100 and ceiling portion 23 (upper wall portion) is longer than the up-down-direction distance between first cell stacks 31 arranged on the first housing region R1 side located on the front side of vehicle 100 and on one side in the first direction and the upper wall portion. Therefore, in the valley-folded portion of housing case 20, a space that allows movement of cell stacks 30 can be sufficiently ensured, and mutual interference between cell stacks 30 moving to come closer to each other can be suppressed. As a result, collision between cell stacks 30 can be suppressed.

In addition, as shown in FIG. 6, in the case where housing case 20 is deformed in a valley-folded manner when rear collision is received by vehicle 100 on which two-stage battery pack 10 is mounted such that upper portion 11 of housing case 20 is arranged in the gap between cross members 4 and 5 arranged side by side along the front-rear direction of vehicle 100, front wall portion 14 of upper portion 11 moves to come closer to cross member 4 located on the more vehicle front side than upper portion 11.

In battery pack 10 according to the embodiment, as described above, the length along the first direction from the one-side ends of at least one or more upper-side cell stacks 34 located on one side in the first direction to front wall portion 14 is longer than the length along the first direction from the other-side ends of at least one or more upper-side cell stacks located on the other side in the first direction to the rear wall portion.

Therefore, a space between the one-side ends of at least one or more upper-side cell stacks 34 located on one side in the first direction and front wall portion 14 can be sufficiently ensured. As a result, even when front wall portion 14 collides with cross member 4 located on the front side of front wall portion 14 and is deformed, interference of upper-side cell stacks 34 with front wall portion 14 can be suppressed.

Furthermore, in battery pack 10 according to the present embodiment, the gap between the plurality of upper-side cell stacks 34 and front wall portion 14 (particularly, the gap between upper-side cell stack 34 arranged on one end in the first direction, of the plurality of upper-side cell stacks 34, and front wall portion 14) is located directly above the gap between lower-side cell stack 33 arranged below upper-side cell stack 34 arranged on the other end in the first direction, of the plurality of upper-side cell stacks 34, and lower-side cell stack 33 adjacent to this lower-side cell stack 33 from one side in the first direction.

Therefore, when housing case 20 is deformed in a valley-folded manner in the portion located between lower-side cell stack 33 arranged below upper-side cell stack 34 facing front wall portion 14 and lower-side cell stack 33 located on the front side (one side in the first direction) of this lower-side cell stack 33, a space that allows movement of lower-side cell stacks 33 adjacent to each other can be more sufficiently ensured in the valley-folded portion of housing case 20. As a result, mutual interference between lower-side cell stacks 33 moving to come closer to each other can be suppressed.

While the embodiment is described above by way of example in connection with the case in which each of support members 50 includes connection portion 51 and rising portion 52 and has a substantially L shape, the present disclosure is not limited thereto. As long as each of support members 50 extends along the up-down direction and is fixed to housing case 20 from the outer side of housing case 20 so as to face rear portion 13 of housing case 20, each of support members 50 can have a shape such as a bar shape and a plate shape, as appropriate. In addition, the number of support members 50 is not limited to two, and single support member 50 may be provided or three or more support members 50 may be provided.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A battery pack mounted on a vehicle, the battery pack comprising:
 a plurality of cell stacks;
 a housing case configured to house the plurality of cell stacks, wherein the housing case includes a rear portion directed to a rear side of the vehicle in a mounted state in which the battery pack is mounted on the vehicle; and
 a support member extending in an up-down direction of the vehicle, the support member having an upper end connected to a rear cross member of the vehicle that extends in a width direction of the vehicle, and a lower end connected to a bottom portion of the housing case, so as to be fixed to an outer side of the housing case and face the rear portion of the housing case,
 wherein the rear portion of the housing case is disposed between the plurality of cell stacks and the support member so as to separate the plurality of cells stacks and the support member.

2. The battery pack according to claim 1, wherein
 the plurality of cell stacks are spaced apart from one another and arranged side by side in a first direction parallel to a front-rear direction of the vehicle in the mounted state,
 the plurality of cell stacks include a plurality of first cell stacks arranged on one side in the first direction that is a front side of the vehicle in the mounted state, and a plurality of second cell stacks arranged on the other side in the first direction that is the rear side of the vehicle in the mounted state,
 the housing case includes an upper wall portion and the bottom portion is connected to the rear portion and arranged to face each other in the up-down direction,
 a first housing region where the plurality of first cell stacks are housed and a second housing region where the plurality of second cell stacks are housed are formed between the upper wall portion and the bottom portion,
 the upper wall portion is provided such that an up-down-direction height on the other side in the first direction is higher than an up-down-direction height on the one side in the first direction, and
 an up-down-direction distance between the second cell stacks arranged on the second housing region side and the upper wall portion is longer than an up-down-direction distance between the first cell stacks arranged on the first housing region side and on the one side in the first direction and the upper wall portion.

3. The battery pack according to claim 2, wherein
 the plurality of second cell stacks include a plurality of lower-side cell stacks, and at least one or more upper-side cell stacks arranged above the plurality of lower-side cell stacks,
 the plurality of lower-side cell stacks are arranged side by side along the first direction on the other side in the first direction of the plurality of first cell stacks,
 the housing case includes a lower portion configured to house the plurality of first cell stacks and the plurality of lower-side cell stacks, and an upper portion configured to house the at least one or more upper-side cell stacks,
 the upper portion includes a rear wall portion forming a part of the rear portion, and a front wall portion facing the rear wall portion from the one side in the first direction, and
 a length along the first direction from one-side ends of the at least one or more upper-side cell stacks located on the one side in the first direction to the front wall portion is longer than a length along the first direction from other-side ends of the at least one or more upper-side cell stacks located on the other side in the first direction to the rear wall portion.

4. The battery pack according to claim 3, wherein
 a gap between the front wall portion and the at least one or more upper-side cell stacks is located directly above a gap between any one pair of lower-side cell stacks adjacent to each other, of the plurality of lower-side cell stacks.

* * * * *